United States Patent [19]

Watanabe

[11] 4,210,956
[45] Jul. 1, 1980

[54] METHOD AND SYSTEM OF CONTROLLING HIGH VOLTAGE DIRECT CURRENT POWER TRANSMISSION PLANTS

[75] Inventor: Atsumi Watanabe, Ibaraki, Japan
[73] Assignee: Hitachi, Limited, Japan
[21] Appl. No.: 865,874
[22] Filed: Dec. 30, 1977
[30] Foreign Application Priority Data
  Jan. 5, 1977 [JP] Japan .................................. 52-92
[51] Int. Cl.² .......................... H02H 7/00; H02J 3/36
[52] U.S. Cl. ...................................... 363/51; 363/35;
   363/37; 363/79
[58] Field of Search ...................... 363/35, 36, 51, 34,
   363/37, 54, 57–58, 74, 78–79; 307/252 R

[56] References Cited
U.S. PATENT DOCUMENTS

| | | |
|---|---|---|
| 3,467,848 | 9/1969 | Ainsworth .............................. 363/51 |
| 3,470,442 | 9/1969 | Ainsworth .............................. 363/35 |
| 3,659,186 | 4/1972 | Machida et al. ....................... 363/51 |
| 3,670,236 | 6/1972 | Ekstrom ............................. 363/35 X |
| 3,701,938 | 10/1972 | Chadwick .............................. 363/51 |
| 3,829,756 | 8/1974 | Hockstetter ........................... 363/35 |
| 3,891,912 | 6/1975 | Watanabe ....................... 307/252 R |
| 3,906,335 | 9/1975 | Watanabe et al. ..................... 363/35 |
| 3,992,659 | 11/1976 | Ekstrom ................................ 363/51 |

*Primary Examiner*—J. D. Miller
*Assistant Examiner*—Peter S. Wong
*Attorney, Agent, or Firm*—Craig and Antonelli

[57] ABSTRACT

In a method and system for controlling high voltage direct current power transmission plants, the delay angle for the each converter is calculated directly by a calculating arrangement, which is provided for controlling all converters totally, from data set by an operator and data transmitted by suitable sending-receiving apparatus from each converter. Each converter receives the delay angle signal by suitable sending-receiving apparatus from the calculating arrangement and operates in accordance with the received delay angle value. The delay angle value is given the following equation.

$$\alpha = \cos^{-1}\left\{ \frac{1}{\frac{3}{\pi}\sqrt{2}\,E} \left(V + \frac{3}{\pi} X I_d\right) \right\}$$

where $\alpha$ is a delay angle value. E is either a measured or calculated A.C. voltage, and if it is a measured voltage, it is the voltage from an A.C. system to which each converter is connected, V is either a set or calculated D.C. voltage, $I_d$ is either a set or calculated D.C. current and X is a converter commutation reactance.

34 Claims, 13 Drawing Figures

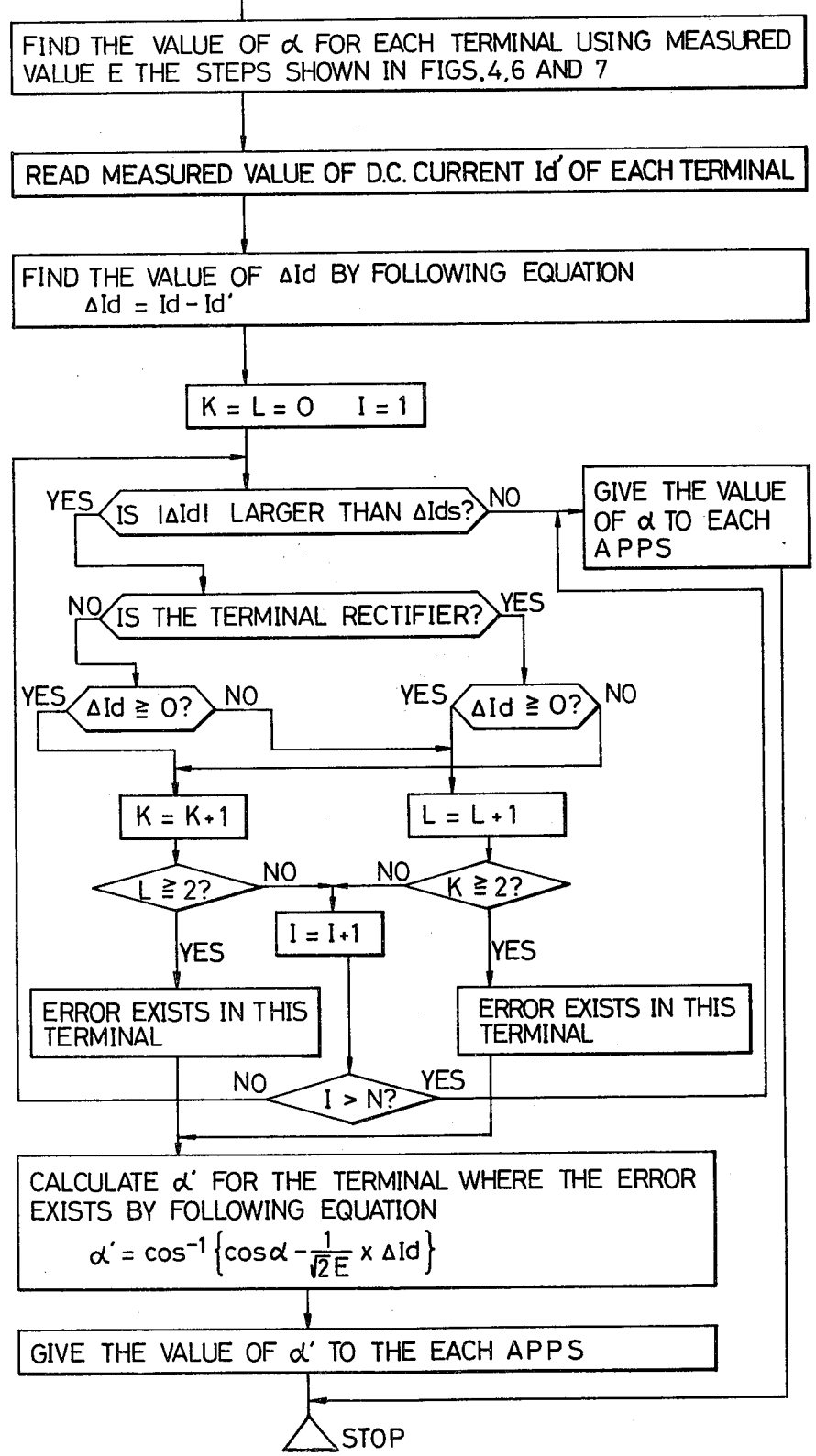

METHOD AND SYSTEM OF CONTROLLING HIGH VOLTAGE DIRECT CURRENT POWER TRANSMISSION PLANTS

FIELD OF THE INVENTION

This invention relates to a method and system of controlling high voltage direct current power transmission plants.

High voltage direct current transmission between points is generally known. Several plants with this point to point construction have already been built. Such plants are usually composed of two current converter stations, but, for example, as shown in U.S. Pat. No. 3,562,780, a high voltage direct current (referred to as HVDC hereinafter)-power plant with more than two stations has been proposed.

In the method and system of controlling these conventional HVDC-power plants, a converter delay angle value is determined by a closed current control loop which outputs a voltage in accordance with the difference between a D.C. current set by the operator and a D.C. current measured by D.C. current transformer, which is connected to a HVDC transmission line.

Each converter is connected on its D.C. side to the transmission line through a D.C. reactor which has a large reactance value. Under normal operating conditions, a D.C. reactor contributes to the stable operation of an HVDC-power plant by maintaining a smooth flow of current in the transmission line. However, under abnormal operating conditions, a D.C. reactor contributes to the unstable operation of the HVDC-power plant by preventing changes in the flow of current in the transmission line. The outputs of the current controlling loop for the converter changes slowly in accordance with changes in current. Therefore, under abnormal operating conditions, converter responses are delayed by the D.C. reactors. This causes a disturbance in the A.C. system and/or in the HVDC-power plant.

However, D.C. reactors cannot be removed from HVDC-power plants, because they contribute to stable plant operation under normal operating conditions. Therefore, improved methods and systems of controlling HVDC-power plants are required.

SUMMARY OF THE INVENTION

In the present invention, it is proposed that the each converter respond directly to a signal which represents a delay angle for the each converter. The signal is calculated by a calculating means, which is provided for all converters totally and included in a central control means, from data set by an operator and data transmitted through a suitable seinding-receiving means from each converter. The signal is transmitted to the each converter through a suitable sending-receiving means from the central control means.

The present invention is characterized in that a delay angle value for each converter is calculated from the A.C. voltage of the A.C. system, to which each converter is connected on its A.C. side; the D.C. voltage of the HVDC line, to which each converter is connected on its D.C. side through a D.C. reactor; and the commutation reactance of each converter station and the D.C. current of each converter.

BRIEF DESCRIPTION OF THE DRAWING

FIGS. 4, 6~8, 10~11 are examples of general flow charts for a programmed digital computer executing predetermined steps in order to produce a delay angle value for each converter.

DESCRIPTION OF THE PREFERRED EMBODIMENT

Figure 1:
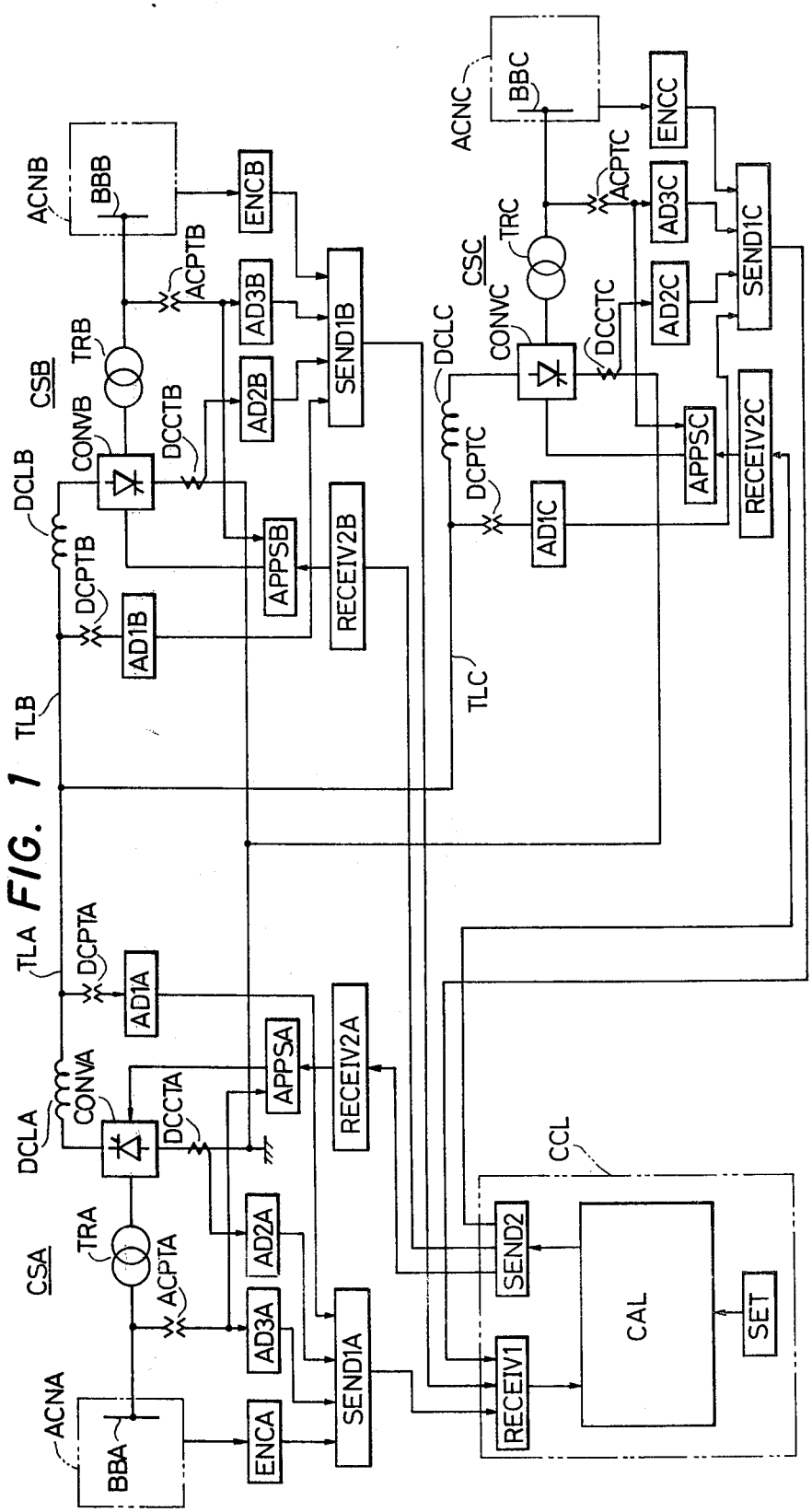
FIG. 1 is a block diagram of an embodiment of the present invention.

FIG. 1 shows three converter stations CSA-CSC arranged in parallel between two D.C. conductors through the D.C. reactors DCLA-DCLC. The two D.C. conductors, which comprise one HVDC transmission line, are divided into the three portions TLA-TLC. Each converter station is composed of a converter CONV which operates either as a rectifier or an inverter, a transformer TR for the converter, a bus bar BB of an A.C. system ACN to which the converter is connected through the transformer, a D.C. potential transformer DCPT for measuring the D.C. voltage of the HVDC line, a D.C. current transformer DCCT for measuring the D.C. current flowing through the converter, an A.C. potential transformer ACPT for measuring the A.C. voltage of the A.C. system, an automatic pulse phase shifter APPS for sending a firing pulse to the converter, three analog-digital converters AD1-AD3 for converting the value of the output of the measuring means DCPT, DCCT and ACPT to a digital signal respectively, an encoder ENC for coding the opening or closing of circuit breakers (not shown in FIG. 1) in the A.C. system, a data sending means SEND 1 for sending the outputs of the analog-digital converters and the encoder to the data receiving means RECEIV 1 of a central control means CCL and a data receiving means RECEIV 2 for receiving the delay angle value calculated in the calculating means CAL of the central control means and sent through the data sending means SEND 2. The central control means further includes a setting means SET for setting some data. In FIG. 1, these apparatus are represented by above reference symbols and the suffixes A, B and C which are used to differentiate stations. Only, the A.C. system and the automatic pulse phase shifter are described with reference to drawings, FIG. 2 and FIG. 3, respectively. The other apparatus shown in FIG. 1 are well known to people working in the field.

Figure 2:
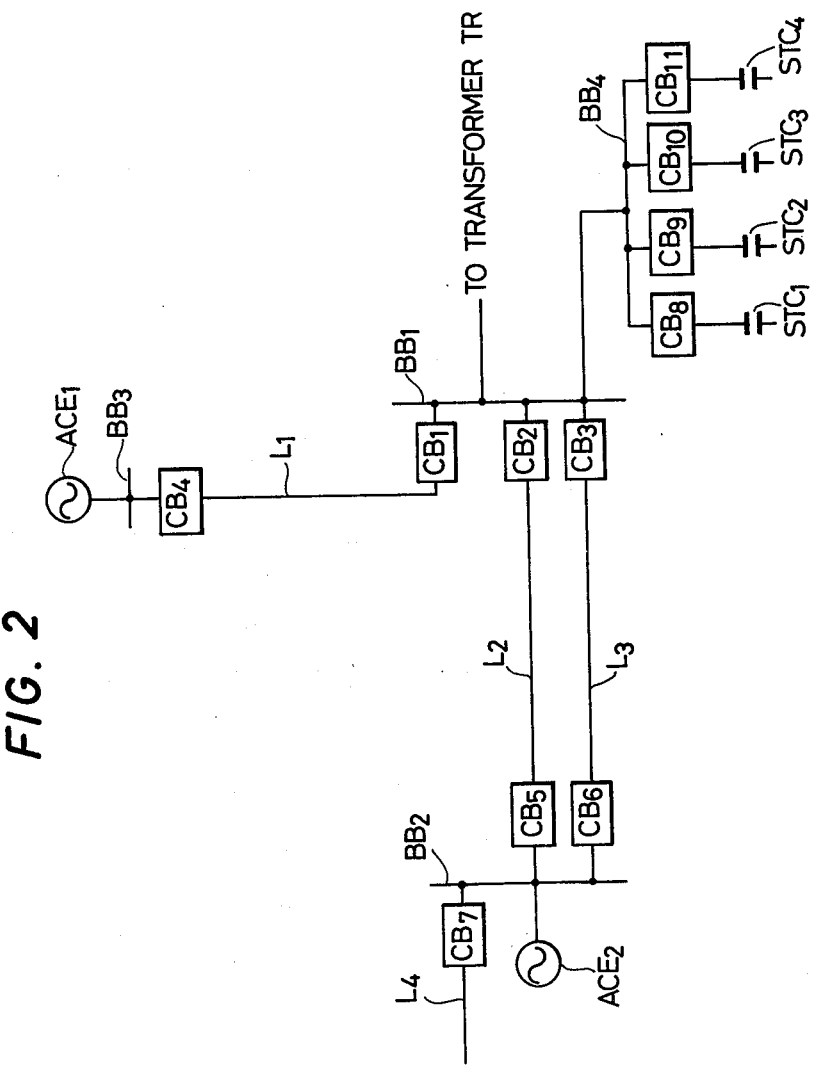
FIG. 2 is a skeleton diagram of the A.C. system shown in FIG. 1.
Figure 3:
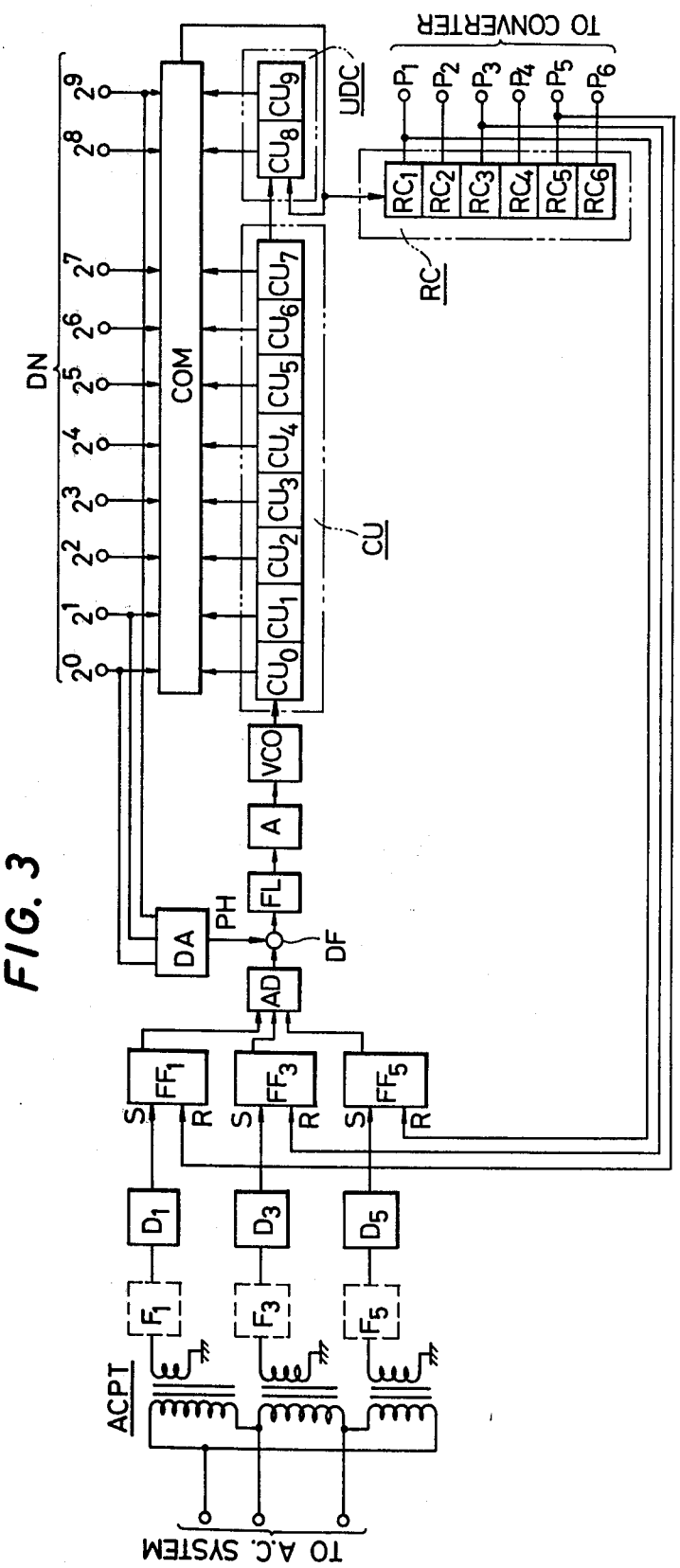
FIG. 3 is a block diagram of an example of the automatic pulse phase shifter shown in FIG. 1.

Of course, this does not mean that either the A.C. system shown in FIG. 2 or the automatic pulse phase shifter shown in FIG. 3 is necessary to the present invention, other similar systems and shifters would work as well.

In FIG. 2, the reference symbols CB1, CB2, ... CB11 indicate circuit breakers, L1, L2 ... L4 A.C.—power transmission lines, ACE1 and ACE2 A.C. power sources, BB1, BB2 ... BB4 bus bars and STC1, STC2 . . . STC4 static condensers. Now suppose that the converter is connected to bus bar BB1. The A.C. voltage of the bus bar BB1 changes with the opening or closing of the circuit breakers CB1, CB2, ... CB11 and the current flowing through the converter CONVA. Especially, in the case where the short circuit capacity of an A.C. system is small, a change in converter current causes a change in A.C. voltage, which is large or small depending on whether the circuit breakers are open or closed, respectively.

Therefore, as will be described later, A.C. voltage is calculated in accordance with circuit breaker conditions and converter current.

A detailed description of the automatic pulse phase shifter shown in FIG. 3 has been omitted, because it is the same as the one shown in FIG. 7 of U.S. Pat. No. 3,891,912, which was invented by the inventor of the present invention.

However, because delay angle calculations for converters in the present invention are obtained in arithmatical calculations and because such calculation may be executed by computer and binary number delay angle values obtained, a brief description of the automatic pulse phase shifter is given. An automatic pulse phase shifter that is actuated by digital signals is more useful than one that is actuated by analog signals.

In FIG. 3, the reference symbols Eu, Ev and Ew represent a 3-phase A.C. system voltage, F1, F3 and F5 waveform converter circuits for converting sine waves into rectangular waves, D1, D3 and D5 differentation circuits, FF1, FF3 and FF5 flip-flop circuits, S and R a set and reset terminal of the flip-flop circuit, AD an adder, DF a differential amplifier, FL a filter, A a D.C. amplifier, VCO a voltage controlled oscillator, CU a 8-bit binary counter, UDC a 2-bit binary up-down counter, RC a 6-bit ring counter, P1, P2, . . . P6 firing pulses, COM a 10-bit comparator, DA a digital-analog converter and DN a pulse phase determination terminal.

As shown in FIG. 1, the central control means receives coded signal from each converter station which indicates whether circuit breakers are open or closed. The central control means also receives the outputs of the analog-digital converters which receive their inputs from the measuring means. The central control means is composed of a calculating means, which is generally a programmed digital computer, and a setting means, which is used by the operator to input data to the calculating means. The operational D.C. voltage $V_{ds}$, current $I_d$, commutation reactance X, minimum delay angle value $\alpha_0$ and minimum margin angle value $\gamma_0$ for each converter and the resistance Rs for the portions TLA, TLB and TLC of the HVDC line are examples of the data which the operator inputs to the calculating means through the setting means. The calculating means produces delay angle values for the converters following programmed steps in accordance with data received from the converter stations and set by the setting means. Converter stations receive calculating means outputs from the central control means through the individual station data receiving means. These calculating means outputs, which represent the delay angle values for the converters, are applied to the pulse phase determination terminals of the automatic pulse phase shifters.

In order to convey more clearly the advantages of the present invention, the following examples of the calculating means producing delay angle values for the converters are given.

EXAMPLE 1

The simplest case of calculating means producing a delay angle value is as follows. Suppose that the short circuit capacity of each A.C. system is much larger than the power transmission capacity of the HVDC-power plant and that the resistance of each portion of the HVDC-line is negligibly small. Given these conditions, the A.C. voltage of the bus-bars to which the converters are connected remains unchanged even when, because of changes in the amount of power transmitted by the HVDC power plant, the amount of current flowing through the converters changes. Voltage drops on HVDC line can also be neglected. This results in the operational D.C. voltage of the converters being equal to one another.

The following equations can be obtained from the above discussion.

$$V_{ds} = (3/\pi)\sqrt{2}\ E_a \cos \alpha_a - (3/\pi)\ X_a\ I_{da} \quad (1)$$

$$-V_{ds} = (3/\pi)\sqrt{2}\ E_b \cos \alpha_b - (3/\pi)\ X_b\ I_{db} \quad (2)$$

$$-V_{ds} = (3/\pi)\sqrt{2}\ E_c \cos \alpha_c - (3/\pi)\ X_c\ I_{dc} \quad (3)$$

Where, $V_{ds}$ is a rated operational D.C. voltage set by the setting means, E is the A.C. voltage of a station measured by the measuring means, $\alpha$ is the converter delay angle value of a station calculated by the calculating means, X is the commutation reactance of a station set by the setting means, and $I_d$ is the operational D.C. current of a converter set by the setting means. The letter suffixes a, b and c indicate that data is associated with the converter stations CSA, CSB and CSC, respectively. These equations means that in this case, the station CSA operates as a rectifier and the other stations operate as invertes. The operational D.C. voltage of inverter stations are shown as minus voltages, because the polarity of the electromotive force of the converter in an inverter station is the opposite of the polarity of the electromotive force of a converter in a rectifier station. In equations (1)~(3), the only unknown datum is the value for the delay angle $\alpha$. Delay angle values for the converters are obtained with the following equations.

$$\alpha a = \cos^{-1}\left\{\frac{1}{\frac{3}{\pi}\sqrt{2}\ E_a}\left(V_{ds} + \frac{3}{\pi} X_a\ I_{da}\right)\right\} \quad (4)$$

$$\alpha b = \cos^{-1}\left\{\frac{1}{\frac{3}{\pi}\sqrt{2}\ E_b}\left(-V_{ds} + \frac{3}{\pi} X_a\ I_{db}\right)\right\} \quad (5)$$

$$\alpha c = \cos^{-1}\left\{\frac{1}{\frac{3}{\pi}\sqrt{2}\ E_c}\left(-V_{ds} + \frac{3}{\pi} X_a\ I_{dc}\right)\right\} \quad (6)$$

Figure 4:
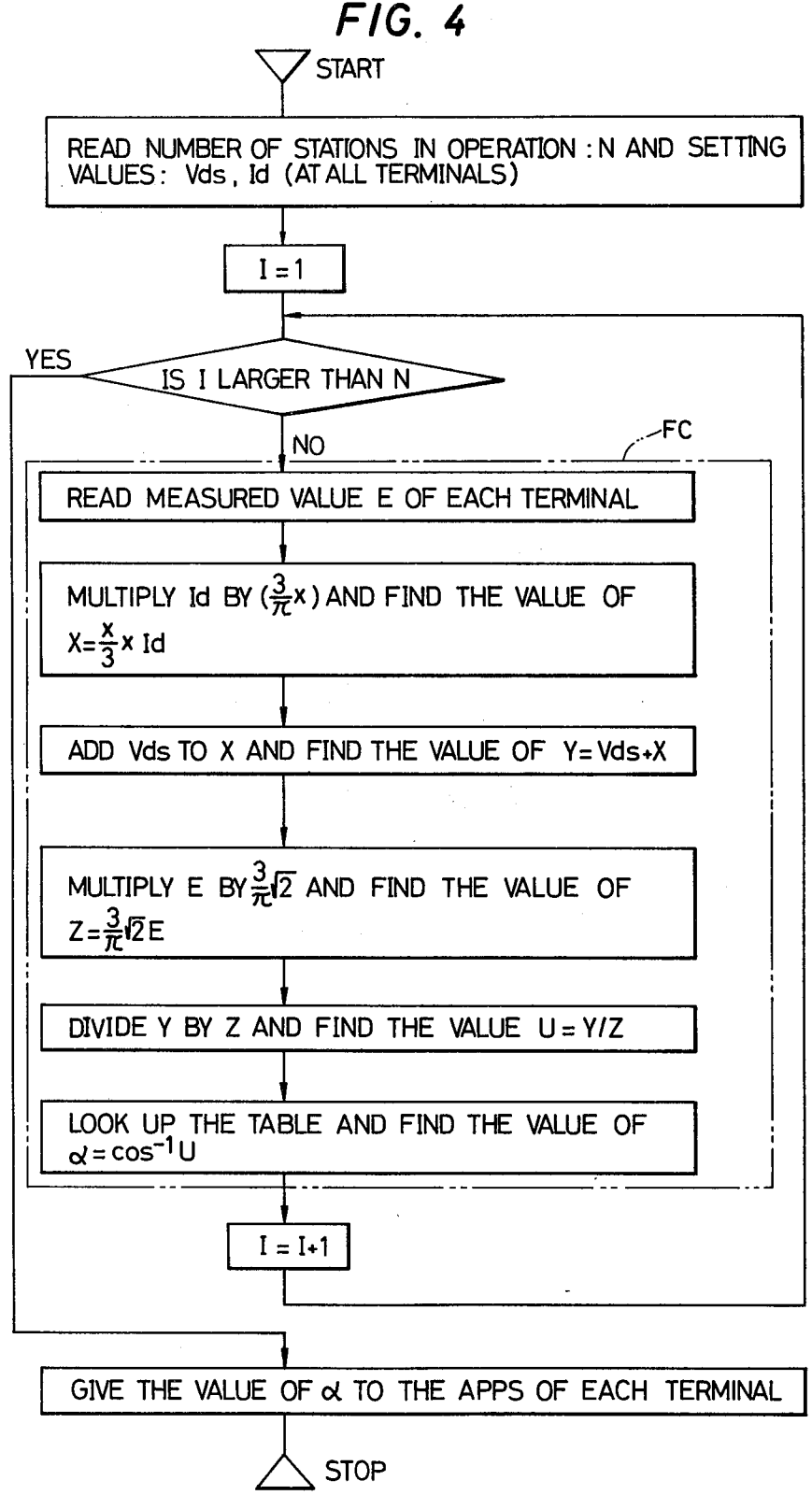

The delay angle $\alpha$ is solved for in equations (a), (b) and (c) with a programed digital computor, which is represented by the calculating means in FIG. 1. FIG. 4 is a general flow chart of a computer program which produces a delay angle value in accordance with the above example 1. The stable operation of HVDC-power plants is possible with the present invention, as is described below with reference to FIG. 5.

Figure 5:
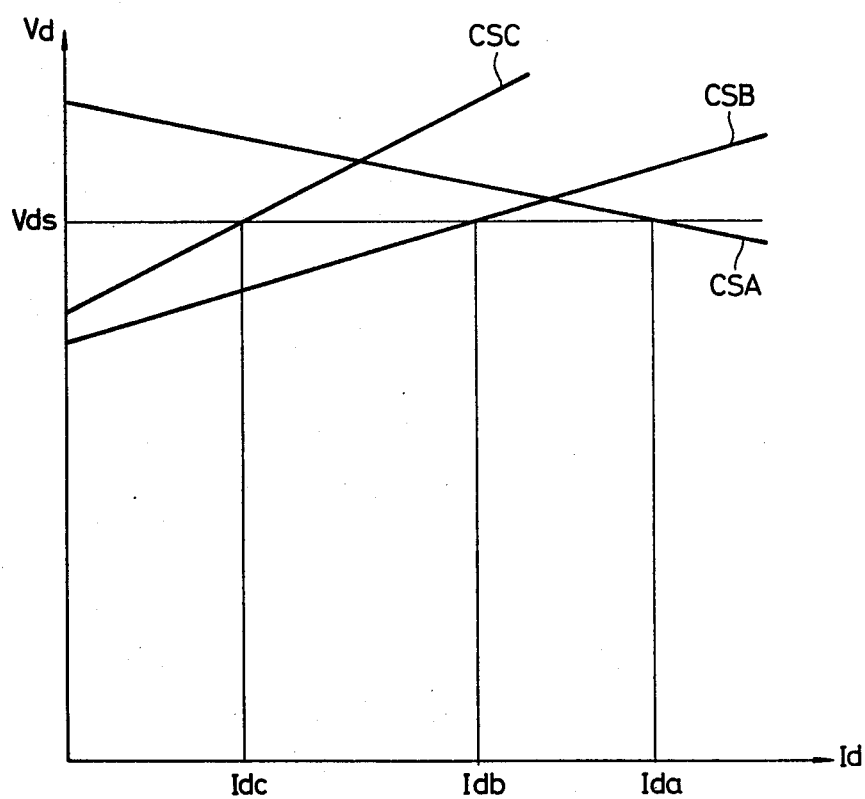
FIGS. 5 and 9 are examples of current-voltage characteristics for converters with constant delay angle value.

The current voltage characteristics of the three parallel-connected converter stations CSA, CSB and CSC, where station CSA is operating as a rectifier station and stations CSB and CSC are operating as inverter stations, and where the delay angle value for each converter is constant, as shown in FIG. 5.

The current $I_{da}$, which flows from the rectifier station, divides into the currents $I_{db}$ and $I_{dc}$, which flow through the converters CONVB and CONVC, respectively, in the inverter stations. The operational D.C. voltage of each converter station is Vds.

Suppose that, for same reason, the current $I_{da}$ increases. If $I_{da}$ increases, then $I_{db}$ and $I_{dc}$ also increase, and the operational D.C. voltage of the rectifier station decreases and the operational voltages of the inverter stations increase. And, this increase leads to a correcting operation in which the current $I_{da}$ decreases.

When, the current $I_{da}$ decreases, a reverse correcting operation occurs.

Or, suppose that, for some reason, the current $I_{da}$ neither increases nor decreases, but that the ratio of distribution of the currents $I_{db}$ and $I_{dc}$ changes. Suppose, for example, that $I_{db}$ increases and $I_{dc}$ decreases. If $I_{db}$ increases and $I_{dc}$ decreases, then the operational D.C. voltage of the converter CONVB increases and that of the converter CONVC decreases. This increase in the operational D.C. voltage of the converter CONVB and decrease in that of the converter CONVC leads to a correcting operation in which the flow of current $I_{db}$ to the converter CONVB decreases and the flow of current $I_{dc}$ to the converter CONVC increases. When the current $I_{db}$ decreases and the current $I_{dc}$ increases, a reverse correcting operation occurs.

In this way the present invention make possible the stable operation of HVDC-power plants. Since the above correcting operations also occur in the examples described below, the stability of operation of HVDC-power plants controlled by the present invention is not described hereinafter.

EXAMPLE 2

This is case where the resistance of an HVDC line cannot be neglected, as it was in example 1. Example 2 differs from Example 1 in that in Example 2 there are voltage drops between converter stations. This means that the operational D.C. voltages of the converters are different from each other. With the present invention, the operational voltage for a point on the HVDC line is set and the operational voltages for the converters are then determined by correcting the set voltage with the voltage drops that occur between the point and the converters.

When the point where the operational D.C. voltage is set is a terminal, for example, the converter CONVA, the voltages for the converters are determined as follows.

$Vdsa = Vds$ $Vdsb = Vdsa - I_{da}Ra - I_{db}Rb$ $Vdsc = Vdsa - I_{da}Rc - I_{dc}Rc$ Where, Vdsa, Vdsb and Vdsc are the operational D.C. voltages of the converters CONVA, CONVB and CONVC, respectively. $I_{da}$, $I_{db}$ and $I_{dc}$ are the currents flowing in the TLA, TLB and TLC portions of the HVDC line and Ra, Rb and Rc are the resistances thereof.

When the point where the operational D.C. voltage is set is a junction of three portions of the HVDC line, the operational D.C. voltages for the converters are determined as follows.

$Vdsa = Vds + I_{da}Ra$ $Vdsb = Vds - I_{db}Rb$ $Vdsc = Vds - I_{dc}Rc$

Where, the reference symbols are the same as those for the case described above.

Figure 6:
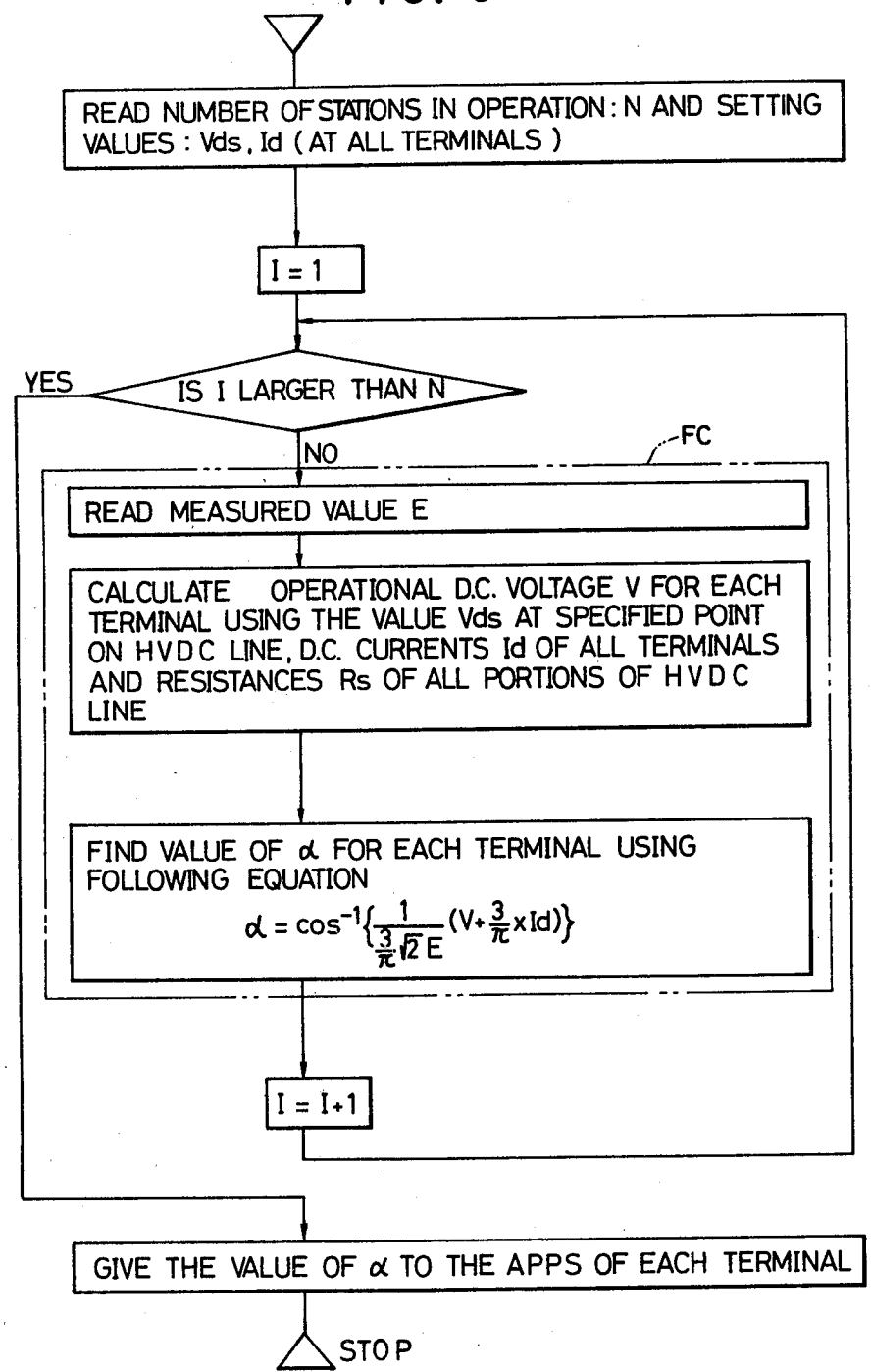

After the operational D.C. voltages for the converters have been determined, delay angle values are obtained as described in Example 1, except that Vdsa, Vdsb and Vds are substituted for Vds in equations (4), (5) and (6). FIG. 6 shows an example of a general flow chart of a digital computer program which produces delay angle values under different operational D.C. voltages. The procedures that are used to calculate delay angle values are explained only briefly in FIG. 6, because they are substantially the same as those shown in FIG. 4.

EXAMPLE 3

This is an example of a response to a change of voltage in an A.C. system. When a fault occurs in an A.C. system and a voltage decrease occurs in the A.C. system, an HVDC-power plant cannot continue operating under a rated operational D.C. voltage. Because, the maximum D.C. voltage Vdmax of the converter in the converter station which is connected to the A.C. system in which the voltage decrease occurred is limited in accordance with the value of the voltage decrease. Furthermore, in order to ensure stable converter operations, converter delay angle values are generally limited to some specified range. Namely, a minimum delay angle value $\alpha_0$ with a range of $5 \sim 10$ degrees is set at the rectifier and a maximum delay angle value with a range of $180 - \gamma_0$ degrees, in which the $\gamma_0$ is a minimum margin angle, is set at the inverter.

Given the above limiting conditions, the maximum D.C. voltages for the converters can be obtained with the following equations.

$$Vdamax = \frac{3\sqrt{2}}{\pi} Ea \cos \alpha_0 - \frac{3}{\pi} Xa I_{da} \quad (7)$$

$$Vdbmax = \frac{3\sqrt{2}}{\pi} Eb \cos \tau_0 - \frac{3}{\pi} Xb I_{db} \quad (8)$$

$$Vdcmax = \frac{3\sqrt{2}}{\pi} Ec \cos \tau_0 - \frac{3}{\pi} Xc I_{dc} \quad (9)$$

If any of these maximum D.C. voltages are smaller than the operational D.C. voltages in Examples 1 and 2 above, the delay angle values for converters must be recalculated as follows. First, select the smallest maximum D.C. voltage Vdmax. Second, calculate the operational D.C. voltage for each terminal with the above mentioned smallest maximum D.C. voltage, following Example 2. Finally, calculate the delay angle value for each converter with the above mentioned operational D.C. voltage.

Figure 7A:
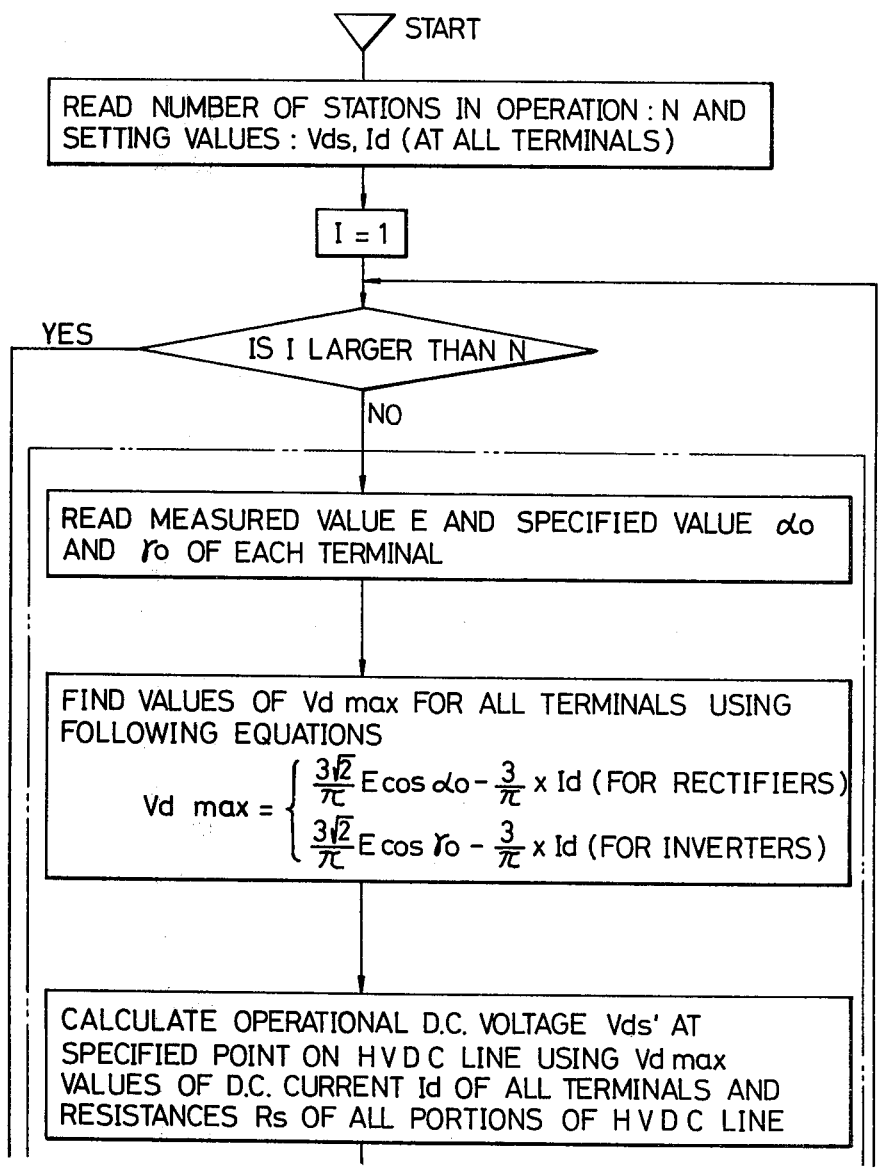
Figure 7B:
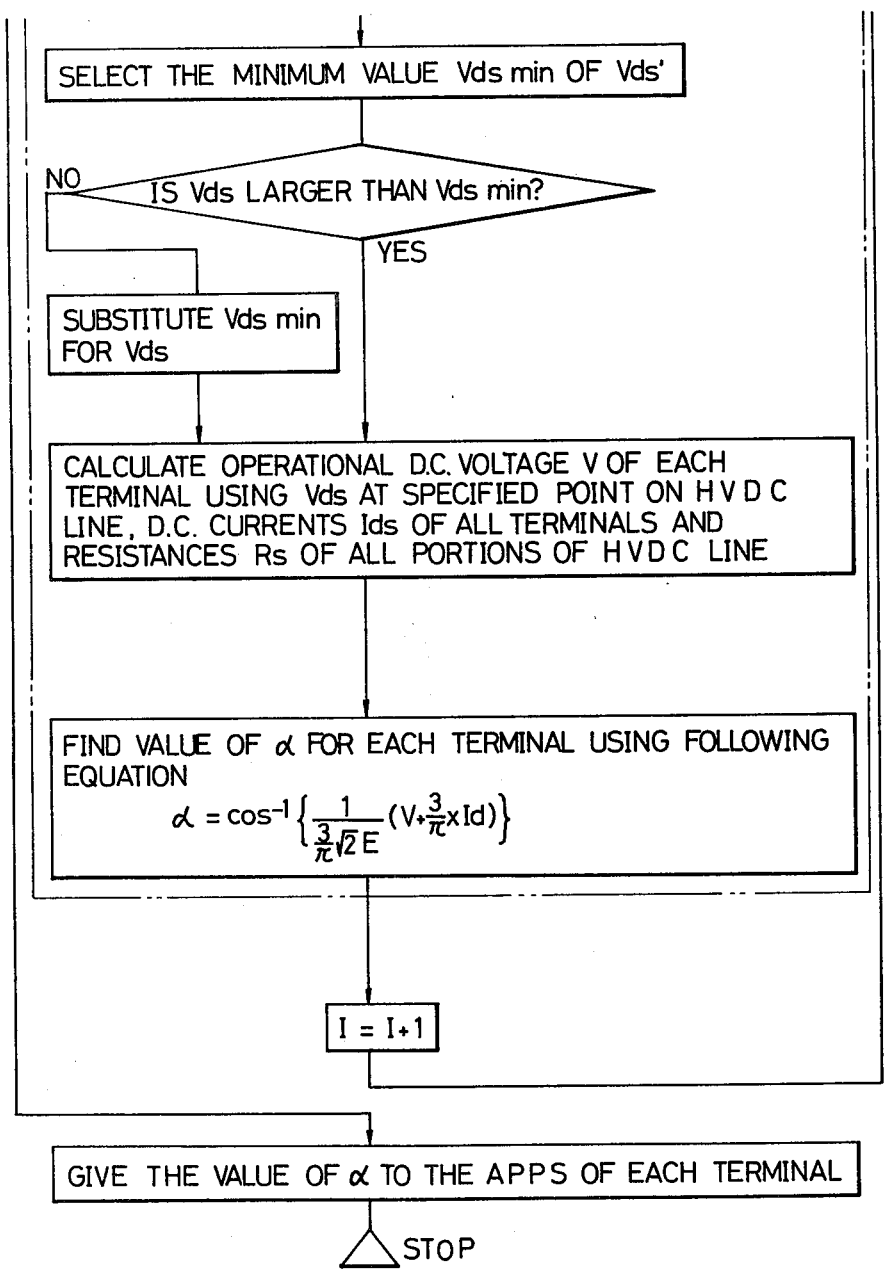
Figure 7C:
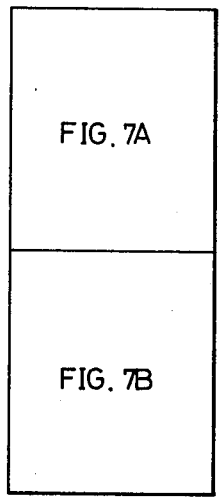

FIGS. 7A and 7B show an example of a general flow chart of a digital computer program which produces delay angle values in accordance with Example 3 above. FIG. 7C shows the relationship between FIG. 7A and 7B.

EXAMPLE 4

This is an example of a converter connected to a weak A.C. system. In this case, when the D.C. current flowing in a converter changes, the current flow distribution in the A.C. system to which the converter is connected is affected, and the A.C. voltage of the bus bar BB1 in the A.C. system changes. In order to determine the delay angle value for the converter, the change in the A.C. voltage of the bus bar BB1 must be predicted before the D.C. current changes. The delay angle value is then given to the APPS of the station at the same time that the converter current is changed by the operator. This predication of A.C. voltages can be carried out by a programed digital computer which is given data about some constants of the A.C. system, about whether circuit breakers in the A.C. system are open or closed and about the converter currents.

Figure 8:
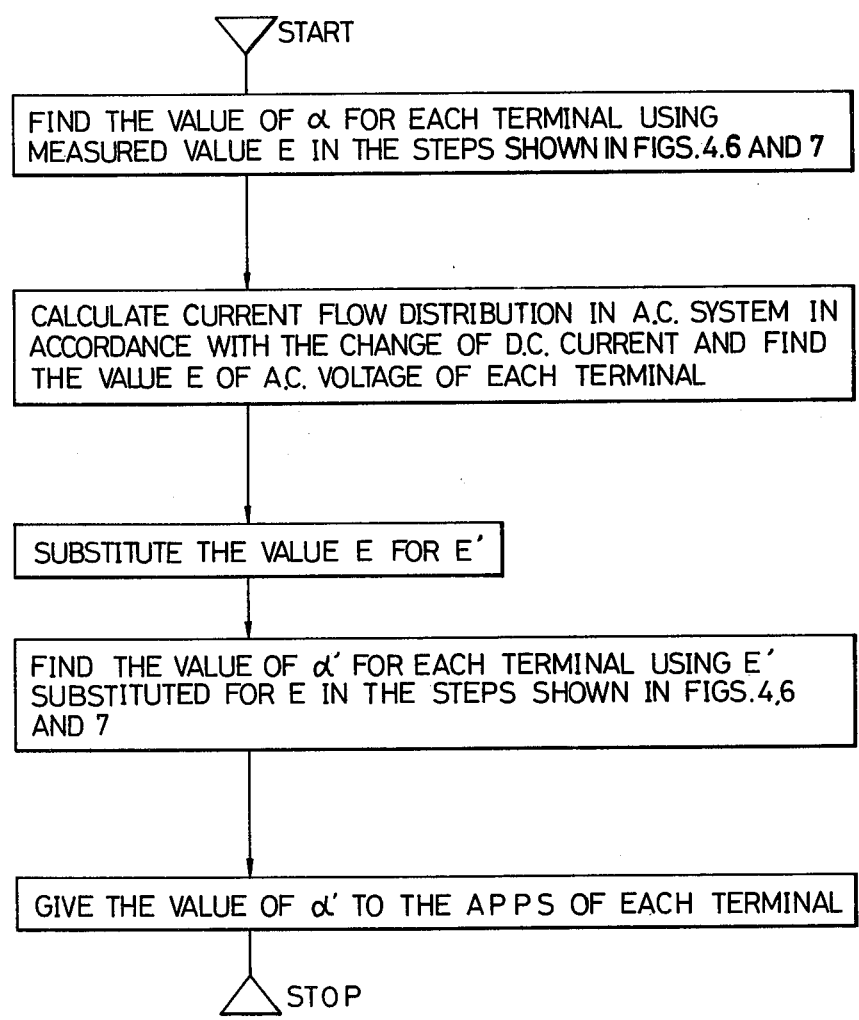

FIG. 8 shows an example of a general flow chart of a digital computer program which produces a delay angle value in accordance with Example 4 above. In FIG. 8, prediction of the above mentioned A.C. voltage change is carried out after the delay angle $\alpha$ is determined, under the assumption that there is no change in converter current.

Figure 9:
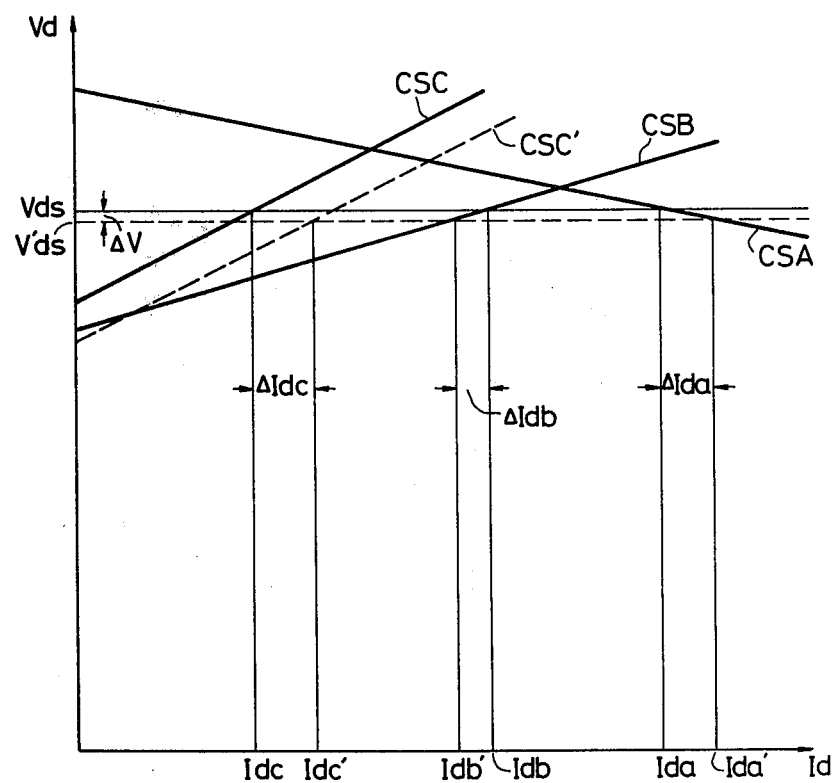

If there are errors in the outputs of the measuring means or the receiving means RECEIV 1, the characteristics of an HVDC-power plant will be different from those selected by the operator, as shown in FIG. 9. The lines CSA~CSC in FIG. 9 are the same as the lines CSA~CSC, respectively, in FIG. 5. Vds is the operational D.C. voltage and $I_{da}$, $I_{db}$ and $I_{dc}$ are the operational D.C. currents. Voltage drops were not considered when drawing the curves in either FIG. 5 or 9.

Suppose that the portion of the output of the receiving means RECEIV 1 which is the output of the measuring means ACPTC contains errors which cause those outputs to be larger than the real values. In such a case, the operational D.C. voltage of the converter CONVC in the inverter station CSC decreases by $\Delta V$ and changes to Vds', which causes line CSC in FIG. 9 to become line CSC'. The operational D.C. current of the converter CONVB also decrease by $\Delta I_{db}$ and changes to $I_{db}'$, and the operational D.C. currents of the converters CONVA and CONVC increase by $\Delta I_{da}$ and $\Delta I_{dc}$, and change to $I_{da}'$ and $I_{dc}'$, respectively, where $|\Delta I_{da}|$ equals $|\Delta I_{dc}| - |\Delta I_{db}|$. If the characteristics set by the operator are to be realized, this situation must be corrected. The present invention allows corrective action to be taken, as is described below in Examples 5 and 6.

EXAMPLE 5

This is a case of the sequential determination of delay angle values. First, the delay angle $\alpha$, which represents the value for each converter under normal operation as described in Examples 1 to 4 and as shown in FIGS. 4, 6 and 7, is determined. Second, the current deviation $\Delta I_d$ of each converter is determined. If the value obtained is equal to or smaller than the predetermined value $\Delta I_{ds}$, the delay angle $\alpha$ determined is given to each converter. If the value obtained is larger than the predetermined value $\Delta I_{ds}$, a new delay angle $\alpha'$ is calculated with the following equations and given to each converter.

$$\frac{3}{\pi} \sqrt{2}\, Ea(\cos \alpha_a - \cos \alpha_a') = \frac{3}{\pi} Xa\, \Delta I_{da} \quad (10)$$

$$\frac{3}{\pi} \sqrt{2}\, Eb(\cos \alpha_b - \cos \alpha_b') = \frac{3}{\pi} Xb\, \Delta I_{db} \quad (11)$$

$$\frac{3}{\pi} \sqrt{2}\, Ec(\cos \alpha_c - \cos \alpha_c') = \frac{3}{\pi} Xc\, \Delta I_{dc} \quad (12)$$

Then, $$\alpha_a' = \cos^{-1}(\cos \alpha_a - \frac{1}{\sqrt{2}\, Ea} Xa\, \Delta I_{da}) \quad (13)$$

$$\alpha_b' = \cos^{-1}(\cos \alpha_b - \frac{1}{\sqrt{2}\, Eb} Xb\, \Delta I_{db}) \quad (14)$$

$$\alpha_c' = \cos^{-1}(\cos \alpha_c - \frac{1}{\sqrt{2}\, Ec} Xc\, \Delta I_{dc}) \quad (15)$$

Third, the voltage deviation $\Delta V$ of each converter is determined. If the value obtained is equal to or smaller than the predetermined value $\Delta Vs$, the delay angle $\alpha'$ is given to each converter. If the value obtained is larger than the predetermined value $\Delta Vs$, a new delay angle $\alpha''$ for each converter is calculated with the following equations and given to each converter.

$$Vda = Vdsa - Vd'sa = \frac{3}{\pi} \sqrt{2}\, Ea(\cos \alpha_a'' - \cos \alpha_a') \quad (16)$$

$$Vdb = -(Vdsb - Vd'sb) = \frac{3}{\pi} \sqrt{2}\, Eb(\cos \alpha_b'' - \cos \alpha_b') \quad (17)$$

$$Vdc = -(Vdsc - Vd'sc) = \frac{3}{\pi} \sqrt{2}\, Ec(\cos \alpha_c'' - \cos \alpha_c') \quad (18)$$

Then, $$\alpha_a'' = \cos^{-1}(\cos \alpha_a' + \frac{\Delta Vda}{\frac{3}{\pi} \sqrt{2}\, Ea}) \quad (19)$$

$$\alpha_b'' = \cos^{-1}(\cos \alpha_b' + \frac{\Delta Vdb}{\frac{3}{\pi} \sqrt{2}\, Eb}) \quad (20)$$

$$\alpha_c'' = \cos^{-1}(\cos \alpha_c' + \frac{\Delta Vdc}{\frac{3}{\pi} \sqrt{2}\, Ec}) \quad (21)$$

Where, Vdsa, Vdsb and Vdsc are the desired operational D.C. voltages of the converters and Vd'sa, Vd'sb and Vd'sc are the measured voltages thereof. The operational D.C. voltages in FIG. 9 are for simplicity shown to be the same but they are generally different from each other, as described in Examples 2 to 4.

Figure 10:
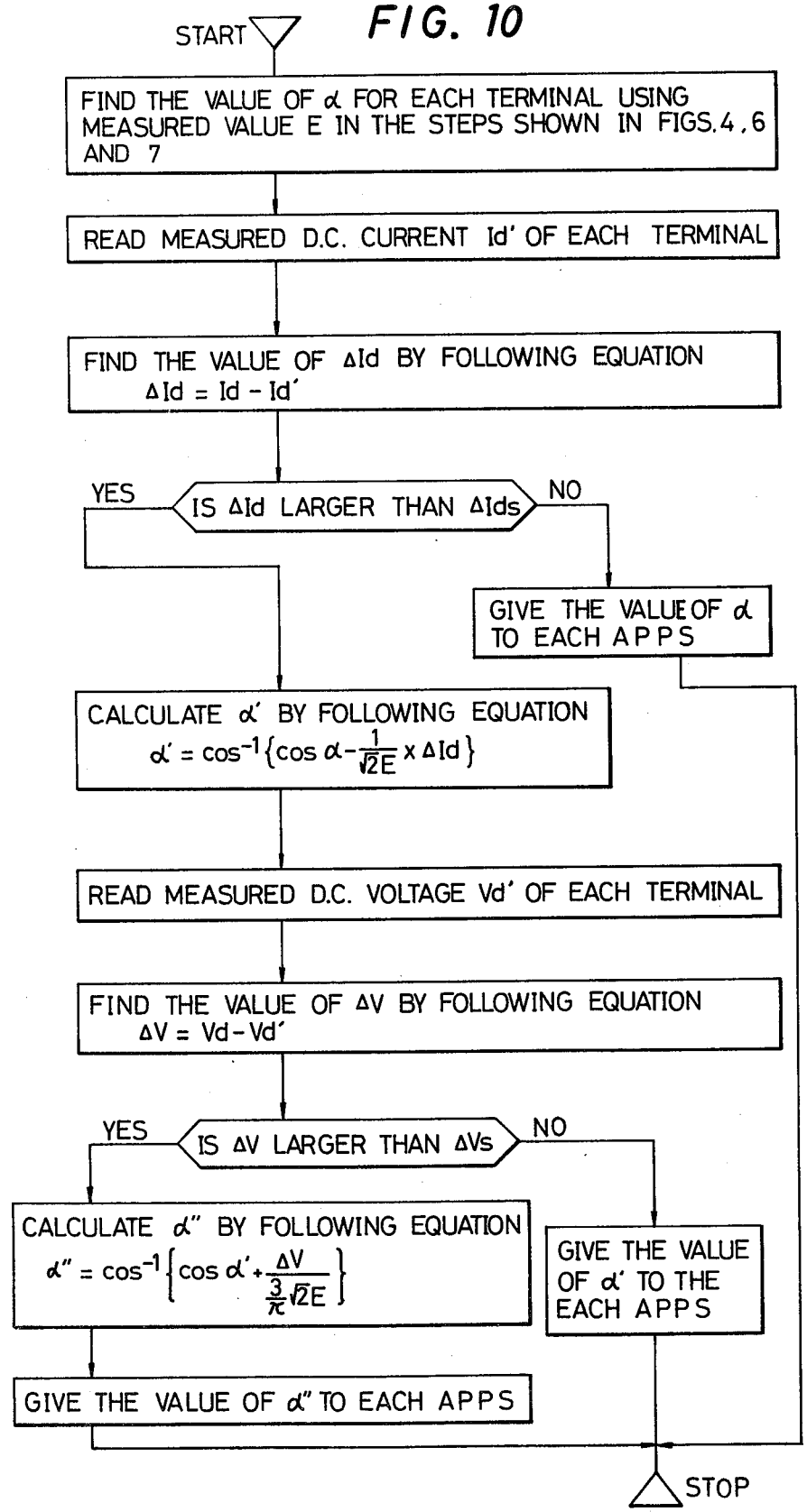

FIG. 10 is an example of a general flow chart of a digital computer program which produces delay angle values in accordance with Example 5 above.

EXAMPLE 6

This is an example in which corrective action is taken with regard to only one station. The present invention can be used in this case, if it is assumed that no more than one error will occure at a same time in the measuring means or RECEIV 1, which is reasonable assumption to make.

As can be seen from FIG. 9, the operational D.C. voltages of CONVA and CONVC must be decreased and the operational D.C. voltage of CONVB must be increased in order to realize the desired characteristics. This indicates that the data error exists in the data relating to the converter station CSC. Under the above assumption, errors exist in the data of the station which evidences a voltage change that is contrary to the changes evidenced by the other stations. Therefore, in this example, the corrective action must be taken with regard to station CSC.

The delay angle $\alpha'$ for the converter station CSC is determined with the following equation.

$$\alpha_c' = \cos^{-1}\left\{ \cos\alpha_c + \frac{1}{\sqrt{2}\, E_c} (X_c \Delta I_{dc} + X_a I_{da}) \right\} \quad (22)$$

FIG. 11 shows an example of a general flow chart of a computer program which produces a delay angle value in accordance with Example 6.

What is claimed is:

1. A method of controlling an HVDC power transmission plant, which comprises a D.C. transmission line, said transmission line comprising two D.C. conductors; at least two converter stations, at least one of said stations being a rectifier and at least one an inverter station, each station being connected on its A.C. side to A.C. system and on its D.C. side in parallel with the other stations through a D.C. reactor, and being provided with an A.C. voltage measuring means for said A.C. system, a D.C. current measuring means for said D.C. transmission line, a first data sending means for sending the outputs of said measuring means to a central control means, a first data receiving means for receiving the outputs of the central control means, and an automatic pulse phase shifter for sending a firing pulse to the converter in the station in accordance with the outputs of said first data receiving means; the central control means being provided with a second data receiving means for receiving the outputs of said first data sending means, a setting means for setting certain data, a calculating means for calculating a delay angle value for each converter in accordance with the outputs of said second data receiving means and said setting means, and a second data sending means for sending the outputs of said calculating means to said first receiving means; which method comprises the steps;
  (a) setting an operational D.C. voltage Vds, current $I_d$ and a commutation reactance X for each converter station,
  (b) calculating by said calculating means a delay angle value $\alpha$ for each converter in accordance with the following equation $$\alpha = \cos^{-1}\left\{ \frac{1}{\frac{3}{\pi}\sqrt{2}\, E} (Vds + \frac{3}{\pi} X I_d) \right\}$$

where E is a measured A.C. voltage, and
  (c) controlling each converter in accordance with the delay angle value calculated therefor by said calculating means of the central control means.

2. A method of controlling an HVDC power transmission plant, which comprises a D.C. transmission line, said transmission line comprising two D.C. conductors; at least two converter stations, at least one of said stations being a rectifier and at least one an inverter station, each station being connected on its A.C. side to an A.C. system and on its D.C. side in parallel with the other stations through a D.C. reactor, and being provided with an A.C. voltage measuring means for said A.C. system, a D.C. current measuring means for said D.C. transmission line, a first data sending means for sending the outputs of said measuring means to a central control means, a first data receiving means for receiving the outputs of the central control means and an automatic pulse phase shifter for sending a firing pulse to the coverter in the station in accordance with the outputs of said first data receiving means; the central control means being provided with a second data receiving means for receiving the outputs of said first data sending means, a setting means for setting certain data, a calculating means for calculating a delay angle value for each converter in accordance with the outputs of said second data receiving means and said setting means and a second data sending means for sending the outputs of said calculating means to said first receiving means; which method comprises the steps;
  (a) setting an operational D.C. voltage Vds for one point on the HVDC transmission line, an operational D.C. current $I_d$ and a commutation reactance X for each converter station and a resistance R for each portion of the HVDC transmission line,
  (b) calculating by said calculating means a D.C. voltage V for each converter station, each D.C. voltage being calculated by correcting said set operation D.C. voltage with the voltage drop on the HVDC transmission line between said one point and the converter station for which a D.C. voltage is being calculated, calculating by said calculating means a delay angle value $\alpha$ for each converter in accordance with the following equation $$\alpha = \cos^{-1}\left\{ \frac{1}{\frac{3}{\pi}\sqrt{2}\, E} (V + \frac{3}{\pi} X I_d) \right\}$$

where E is a measured A.C. voltage, and
  (c) controlling each converter in accordance with the delay angle value calculated therefore by said calculating means of the central control means.

3. A method of controlling an HVDC-power transmission plant according to claim 2, further comprising the step of detecting that the A.C. voltage of each converter station is larger than a predetermined value.

4. A method of controlling an HVDC-power transmission plant according to claim 2, wherein each converter station further includes a D.C. current measuring means for said HVDC transmission line; and the method further includes the steps of:
  calculating by said calculating means the current deviation $\Delta I_d$ for each converter station, and
  calculating by said calculating means a delay angle value $\alpha'$ for each converter in accordance with the following equation, $$\alpha' = \cos^{-1}\left\{ \cos\alpha - \frac{1}{\sqrt{2}\, E} X \cdot \Delta I_d \right\}, \text{ and}$$

the step of controlling each converter includes selectively controlling each converter in accordance with at least one of the calculated delay angle value $\alpha$ and the calculated delay angle value $\alpha'$.

5. A method of controlling an HVDC-power transmission plant according to claim 4, each station further including a D.C. voltage measuring means for said HVDC transmission line, and the method further including the steps of:

calculating by said calculating means a voltage deviation $\Delta V$ for each converter station, calculating by said calculating means a delay angle value $\alpha''$ for each converter in accordance with the following equation, $$\alpha'' = \cos^{-1}\left\{ \cos\alpha + \frac{1}{\frac{3}{\pi}\sqrt{2}\,E} \Delta V \right\}, \text{ and}$$

the step of controlling each converter includes selectively controlling each converter in accordance with at least one of the calculated delay angle value $\alpha$, the calculated delay angle $\alpha'$, and the calculated delay angle value $\alpha''$.

6. A method of controlling an HVDC-power transmission plant according to claim 4, the method further including the steps of:

calculating by said calculating means a delay angle value $\alpha''$ for only one converter, which evidences a voltage change that is contrary to the changes evidenced by the all other stations, with the following equation, $$\alpha'' = \cos^{-1}\left\{ \cos\alpha - \frac{1}{\sqrt{2}\,E}(X\Delta I_d + X'\Delta I_d') \right\}$$

where $X'$ is the commutation reactance and $\Delta I_d'$ is the D.C. current deviation of another converter station, and the step of controlling each converter includes selectively controlling the one converter in accordance with the calculated delay angle value $\alpha''$.

7. A method of controlling an HVDC power transmission plant, which comprises a D.C. transmission line, said transmission line comprising two D.C. conductors; at least two converter stations, at least one of said stations being a rectifier and at least one an inverter station, each station being connected on its A.C. side to an A.C. system and on its D.C. side in parallel with the other stations through a D.C. reactor, and being provided with A.C. voltage measuring means for said A.C. system, a D.C. current measuring means for said D.C. transmission line, a first data sending means for sending the outputs of said measuring means to a central control means, a first data receiving means for receiving the outputs of the central control means and an automatic pulse phase shifter for sending a firing pulse to the converter in the station in accordance with the outputs of said first data receiving means; the central control means being provided with a second data receiving means for receiving the outputs of said first data sending means, a setting means for setting certain data, a calculating means for calculating a delay angle value for each converter in accordance with the outputs of said second data receiving means and said setting means and a second data sending means for sending the outputs of said calculating means to said first receiving means; which method comprises the steps;

(a) setting a minimum delay angle value $\alpha_O$ for the converter in each rectifier station, a margin angle value $\gamma_O$ for the converter in each inverter station, an operational D.C. current $I_d$ and a commutation reactance $X$ for each converter station and a resistance $R$ for each portion of the HVDC transmission line, (b) calculating by said calculating means a maximum D.C. voltage $V_{dmax}$ for each converter station in accordance with the following equations, $$V_d\text{Max} = \frac{3\sqrt{2}}{\pi} E \cos\alpha_0 - \frac{3}{\pi} X I_d \quad \text{(rectifier station)}$$

$$V_d\text{Max} = \frac{3\sqrt{2}}{\pi} E \cos\gamma_0 - \frac{3}{\pi} X I_d \quad \text{(inverter station)}$$

where, $E$ is a measured A.C. voltage, (c) selecting the converter station which can be operated with the smallest maximum D.C. voltage calculated in the above steps, (d) calculating by said calculating means a D.C. voltage $V$ for each converter station not selected in step (c) above, each D.C. voltage being calculated by correcting said smallest maximum D.C. voltage with the voltage drop on the HVDC transmission line between said selected station and the station for which a D.C. voltage is being calculated, calculating by said calculating means a delay angle value $\alpha$ for each converter in accordance with the following equation $$\alpha = \cos^{-1}\left\{ \frac{1}{\frac{3}{\pi}\sqrt{2}\,E}\left(V + \frac{3}{\pi} X I_d\right) \right\}$$

where, $E$ is a measured A.C. voltage, $V$ is a selected smallest D.C. voltage or calculated D.C. voltage in above steps, and (f) controlling each converter in accordance with the delay angle value calculated therefore by said calculating means of the central control means.

8. A method of controlling an HVDC-power transmission plant according to claim 7, wherein, each converter station further includes a D.C. current measuring means for said HVDC transmission line; and the method further includes the steps of:

calculating by said calculating means the current deviation $\Delta I_d$ for each converter station, and calculating by said calculating means a delay angle value $\alpha'$ for each converter in accordance with the following equation, $$\alpha' = \cos^{-1}\left\{ \cos\alpha - \frac{1}{\sqrt{2}\,E} X \cdot \Delta I_d \right\}, \text{ and}$$

the step of controlling each converter includes selectively controlling each converter in accordance with at least one of the calculated delay angle value $\alpha$ and the calculated delay angle value $\alpha'$.

9. A method of controlling an HVDC-power transmission plant according to claim 8, each station further including a D.C. voltage measuring means for said HVDC transmission line, and the method further including the steps of:

calculating by said calculating means a voltage deviation $\Delta V$ for each converter station, calculating by said calculating means a delay angle value $\alpha''$ for each converter in accordance with the following equation, $$\alpha'' = \cos^{-1}\left(\cos\alpha + \frac{1}{\frac{3}{\pi}\sqrt{2}\,E}\Delta V\right), \text{ and}$$

the step of controlling each converter includes selectively controlling each converter in accordance with at least one of the calculated delay angle value α, the calculated delay angle α', and the calculated delay angle value α".

10. A method of controlling an HVDC-power transmission plant according to claim 8, the method further including the steps of:

calculating by said calculating means a delay angle value α" for only one converter, which evidences a voltage change that is contrary to the changes evidenced by the all other stations, with the following equation, $$\alpha'' = \cos^{-1}\left(\cos\alpha - \frac{1}{\sqrt{2}\,E}(X\Delta I_d + X'\Delta I'_d)\right)$$

where X' is the commutation reactance and $\Delta I_d'$ is the D.C. current deviation of another converter station, and the step of controlling each converter includes selectively controlling the one converter in accordance with the calculated delay angle value α".

11. A method of controlling an HVDC power transmission plant, which comprises a D.C. transmission line, said transmission line comprising two D.C. conductors; at least two converter stations, at least two converter stations, at least one of said stations being a rectifier and at least one an inverter station, each station being connected on its A.C. side to an A.C. system and on its D.C. side in parallel with the other stations through a D.C. reactor, and being provided with an A.C. voltage measuring means for said A.C. system, a D.C. current measuring means for said D.C. transmission line, an encoder for coding the the opening or closing of circuit breakers in said A.C. system, a first data sending means for sending the outputs of said measuring means and said encoder to a central control means, a first data receiving means for receiving the outputs of the central control means and an automatic pulse phase shifter for sending a firing pulse to the converter in the station in accordance with the outputs of said first data receiving means; the central control means being provided with a second data receiving means for receiving the outputs of said first data sending means, a setting means for setting certain data, a calculating means for calculating a delay angle value for each converter in accordance with the outputs of said second data receiving means and said setting means and a second data sending means for sending the outputs of said calculating means to said first receiving means; which method comprises the steps;

(a) setting an operational D.C. current $I_d$ and a commutation reactance X for each converter station, a resistance R for each portion of the HVDC transmission line, some constants of said A.C. system, a minimum delay angle value $\alpha_O$ for the converter in each rectifier station and a margin angle value $\gamma_O$ for the converters in each inverter station, (b) calculating by said calculating means each A.C. voltage E of each said A.C. system in accordance with said some constants of each said A.C. system in the case where each said operational D.C. current is changed, (c) calculating by said calculating means a maximum D.C. voltage Vdmax for each converter station in accordance with the following equations, $$V_d\text{Max} = \frac{3\sqrt{2}}{\pi}E\cos\alpha_0 - \frac{3}{\pi}XI_d \quad \text{(rectifier station)}$$

$$V_d\text{Max} = \frac{3\sqrt{2}}{\pi}E\cos\gamma_0 - \frac{3}{\pi}XI_d \quad \text{(inverter station)}$$

(d) selecting the converter station which can be operated with the smallest maximum D.C. voltage calculated in the above steps, (e) calculating by said calculating means a D.C. voltage V for each converter station not selected in step (d) above, each D.C. voltage being calculated by correcting said smallest D.C. voltage with the voltage drop on the HVDC transmission line between said selected station and the station for which a D.C. voltage is being calculated, (f) calculating by said calculating means a delay angle value Δ for each converter in accordance with the following equation, $$\alpha = \cos^{-1}\left(\frac{1}{\frac{3}{\pi}\sqrt{2}\,E}\left(V + \frac{3}{\pi}XI_d\right)\right)$$

where, V is the selected smallest maximum D.C. voltage or the D.C. voltage calculated in the above steps, and (g) controlling each converter in accordance with the delay angle value calculated therefore by said calculating means of the central control means.

12. A method of controlling an HVDC-power transmission plant according to claim 1, wherein, each converter station further includes a D.C. current measuring means for said HVDC transmission line; and the method further includes the steps of;

calculating by said calculating means the current deviation $\Delta I_d$ for each converter station, and calculating by said calculating means a delay angle value α' for each converter in accordance with the following equation, $$\alpha' = \cos^{-1}\left(\cos\alpha - \frac{1}{\sqrt{2}\,E}X\cdot\Delta I_d\right), \text{ and}$$

the step of controlling each converter includes selectively controlling each converter in accordance with at least one of the calculated delay angle value α and the calculated delay angle value α'.

13. A method of controlling an HVDC-power transmission plant according to claim 12, each station further including a D.C. voltage measuring means for said HVDC transmission line, and the method further including the steps of, calculating by said calculating means a voltage deviation ΔV for each converter station, calculating by said calculating means a delay angle value $\alpha''$ for each converter in accordance with the following equation $$\alpha'' = \cos^{-1}\left( \cos\alpha + \frac{1}{\frac{3}{\pi}\sqrt{2}\,E} \Delta V \right), \text{ and}$$

the step of controlling each converter includes selectively controlling each converter in accordance with at least one of the calculated delay angle value $\alpha$, the calculated delay angle $\alpha'$, and the calculated delay angle value $\alpha''$.

14. A method of controlling an HVDC-power transmission plant according to claim 12, the method further including; the steps of, calculating by said calculating means a delay angle value $\alpha''$ for only one converter, which evidences a voltage change that is contrary to the changes evidenced by the all other stations, with the following equation, $$\alpha'' = \cos^{-1}\left( \cos\alpha - \frac{1}{\sqrt{2}\,E}(X\Delta I_d + X'\Delta I_d') \right)$$

where $X'$ is the commutation reactance and $\Delta I_d'$ is the D.C. current deviation of another converter station and the step of controlling each converter includes selectively controlling the one converter in accordance with the calculated delay angle value $\alpha''$.

15. A method of controlling an HVDC-power transmission plant according to claim 11, wherein, each converter station further includes a D.C. current measuring means for said HVDC transmission line; and the method further includes the steps of:

calculating by said calculating means the current deviation $\Delta I_d$ for each converter station, and calculating by said calculating means a delay angle value $\alpha'$ for each converter in accordance with the following equation, $$\alpha' = \cos^{-1}\left( \cos\alpha - \frac{1}{\sqrt{2}\,E} X \cdot \Delta I_d \right), \text{ and}$$

the step of controlling each converter includes selectively controlling each converter in accordance with at least one of the calculated delay angle value $\alpha$ and the calculated delay angle value $\alpha'$.

16. A method of controlling an HVDC-power transmission plant according to claim 15, each station further including a D.C. voltage measuring means for said HVDC transmission line, and the method further including the steps of:

calculating by said calculating means a voltage deviation $\Delta V$ for each converter station, calculating by said calculating means a delay angle value $\alpha''$ for each converter in accordance with the following equation, $$\alpha'' = \cos^{-1}\left( \cos\alpha + \frac{1}{\frac{3}{\pi}\sqrt{2}\,E} \Delta V \right), \text{ and}$$

the step of controlling each converter includes selectively controlling each converter in accordance with at least one of the calculated delay angle value $\alpha$, the calculated delay angle $\alpha'$, and the calculated delay angle value $\alpha''$.

17. A method of controlling an HVDC-power transmission plant according to claim 15, the method further including the steps of:

calculating by said calculating means a delay angle value $\alpha''$ for only one converter, which evidences a voltage change that is contrary to the changes evidenced by the all other stations, with the following equation, $$\alpha'' = \cos^{-1}\left( \cos\alpha - \frac{1}{\sqrt{2}\,E}(X\Delta I_d + X'\Delta I_d') \right)$$

where $X'$ is the commutation reactance and $\Delta I_d'$ is the D.C. current deviation of another converter station, and the step of controlling each converter includes selectively controlling the one converter in accordance with the calculated delay angle value $\alpha''$.

18. A system of controlling an HVDC power transmission plant, which comprises a D.C. transmission line, said transmission line comprising two D.C. conductors; at least two converter stations, at least one of said stations being a rectifier and at least one an inverter station, each station being connected on its A.C. side to an A.C. system and on its D.C. side in parallel with the other stations through a D.C. reactor, and being provided with an A.C. voltage measuring means for said A.C. system, a D.C. current measuring means for said D.C. transmission line, a first data sending means for sending the outputs of said measuring means to a central control means, a first data receiving means for receiving the outputs of the central control means and an automatic pulse phase shifter for sending a firing pulse to the converter in the station in accordance with the outputs of said first data receiving means; the central control means being provided with a second data receiving means for receiving the outputs of said first data sending means, a setting means for setting certain data, a calculating means for calculating a delay angle value for each converter in accordance with the outputs of said second data receiving means and said setting means and a second data sending means for sending the outputs of said calculating means to said first receiving means; which system further comprises;

(a) means for setting an operational D.C. voltage $V_{ds}$, current $I_d$ and a commutation reactance $X$ for each converter station, and (b) said delay angle value calculating means calculating a delay angle value $\alpha$ for each converter in accordance with the following equation $$\alpha = \cos^{-1}\left( \frac{1}{\frac{3}{\pi}\sqrt{2}\,E}\left(V_{ds} + \frac{3}{\pi} X I_d\right) \right)$$

where, E is a measured A.C. voltage.

19. A system of controlling an HVDC-power transmission plant according to claim 18; wherein, each converter station further includes a D.C. current measuring means for said HVDC transmission line; means for calculating the current deviation $\Delta I_d$ for each converter station, and said delay angle value calculating means including means for calculating a delay angle value $\alpha'$ for each converter in accordance with the following equation, $$\alpha' = \cos^{-1}\left(\cos\alpha - \frac{1}{\sqrt{2}\,E} X \cdot \Delta I_d\right).$$

20. A system of controlling an HVDC-power transmission plant according to claim 19, wherein each converter station further includes a D.C. voltage measuring means for said HVDC transmission line, means for calculating a voltage deviation $\Delta V$ for each converter station, said delay angle value calculating means including means for calculating a delay angle value $\alpha''$ for each converter in accordance with the following equation, $$\alpha'' = \cos^{-1}\left(\cos\alpha - \frac{1}{\frac{3}{\pi}\sqrt{2}\,E} \Delta V\right).$$

21. A system of controlling an HVDC-power transmission plant according to claim 19, wherein said delay angle value calculating means includes means for calculating a delay angle value $\alpha''$ for only one converter, which evidences a voltage change that is contrary to the changes evidenced by the all other stations, with the following equation, $$\alpha'' = \cos^{-1}\left(\cos\alpha - \frac{1}{\sqrt{2}\,E}(X\Delta I_d + X'\Delta I'_d)\right)$$

where, $X'$ is the commutation reactance and $\Delta I_d'$ is the D.C. current deviation of another converter station.

22. A system of controlling an HVDC power transmission plant, which comprises a D.C. transmission line, said transmission line comprising two D.C. conductors; at least two converter stations, at least one of said stations being a rectifier and at least one an inverter station, each station being connected on its A.C. side to an A.C. system and on its D.C. side in parallel with the other stations through a D.C. reactor, and being provided with an A.C. voltage measuring means for said A.C. system, a D.C. current measuring means for said D.C. transmission line, a first data sending means for sending the outputs of said measuring means to a central control means, a first data receiving means for receiving the outputs of the central control means and an automatic pulse phase shifter for sending a firing pulse to the converter in the station in accordance with the outputs of said first data receiving means; the central control means being provided with a second data receiving means for receiving the outputs of said first data sending means, a setting means for setting certain data, a calculating means for calculating a delay angle value for each converter in accordance with the outputs of said second data receiving means and said setting means and a second data sending means for sending the outputs of said calculating means to said first receiving means; which system further comprises;

(a) means for setting an operational D.C. voltage Vds for one point on the HVDC transmission line, an operational D.C. current $I_d$ and a commutation reactance X for each converter station and a resistance R for each portion of the HVDC transmission line, (b) means for calculating a D.C. voltage V for each converter station, each D.C. voltage being calculated by correcting said set operation D.C. voltage with the voltage drop on the HVDC transmission line between said one point and the converter station for which a D.C. voltage is being calculated, and (c) said delay angle value calculating means calculating a delay angle value $\alpha$ for each converter in accordance with the following equation, $$\alpha = \cos^{-1}\left(\frac{1}{\frac{3}{\pi}\sqrt{2}\,E}\left(V + \frac{3}{\pi}X I_d\right)\right)$$

where, E is a measured A.C. voltage.

23. A system of controlling an HVDC-power transmission plant according to claim 22, further comprising means for detecting that the A.C. voltage of each converter station is larger than a predetermined value.

24. A system of controlling an HVDC-power transmission plant according to claim 22, wherein each converter station further includes a D.C. current measuring means for said HVDC transmission line; means for calculating the current deviation $\Delta I_d$ for each converter station, and said delay angle value calculating means including means for calculating a delay angle value $\alpha'$ for each converter in accordance with the following equation, $$\alpha' = \cos^{-1}\left(\cos\alpha - \frac{1}{\sqrt{2}\,E} X \cdot \Delta I_d\right).$$

25. A system of controlling an HVDC-power transmission plant according to claim 24, wherein each converter station further includes a D.C. voltage measuring means for said HVDC transmission line, means for calculating a voltage deviation $\Delta V$ for each converter station, said delay angle value calculating means including means for calculating a delay angle value $\alpha''$ for each converter in accordance with the following equation, $$\alpha'' = \cos^{-1}\left(\cos\alpha - \frac{1}{\frac{3}{\pi}\sqrt{2}\,E} \Delta V\right).$$

26. A system of controlling an HVDC-power transmission plant according to claim 24, wherein said delay angle value calculating means includes means for calculating a delay angle value $\alpha''$ for only one converter, which evidences a voltage change that is contrary to the changes evidenced by the all other stations, with the following equation, $$\alpha'' = \cos^{-1}\left\{\cos\alpha - \frac{1}{\sqrt{2}\ E}(X\Delta I_d + X'\Delta I_d')\right\}$$

where $X'$ is the commutation reactance and $\Delta I_d'$ is the D.C. current deviation of another converter station.

27. A system of controlling an HVDC power transmission plant, which comprises a D.C. transmission line, said transmission line comprising two D.C. conductors; at least two converter stations, at least one of said stations being a rectifier and at least one an inverter station, each station being connected on its A.C. side to an A.C. system and on its D.C. side in parallel with the other stations through a D.C. reactor, and being provided with an A.C. voltage measuring means for said A.C. system, a D.C. current measuring means for said D.C. transmission line, an encoder for coding the opening or closing of circuit breakers in an said A.C. system, a first data sending means for sending the outputs of said measuring means and said encoder to a central control means, a first data receiving means for receiving the outputs of the central control means and an automatic pulse phase shifter for sending a firing pulse to the converter in the station in accordance with the outputs of said first data receiving means; the central control means being provided with a second data receiving means for receiving the outputs of said first data sending means, a setting means for setting certain data, a calculating means for calculating a delay angle value for each converter in accordance with the outputs of said second data receiving means and said setting means and a second data sending means for sending the outputs of said calculating means to said first receiving means; which system further comprises;

(a) means for setting a minimum delay angle value $\alpha_0$ for the converter in each rectifier station, a margin angle value $\gamma_0$ for the converter in each inverter station, an operational D.C. current $I_d$ and a commutation reactance X for each converter station and a resistance R for each portion of the HVDC transmission line, (b) means for calculating a maximum D.C. voltage Vdmax for each converter station in accordance with the following equations, $$VdMax = \frac{3\sqrt{2}}{\pi} E\cos\alpha_0 - \frac{3}{\pi}XI_d \quad \text{(rectifier station)}$$

$$VdMax = \frac{3\sqrt{2}}{\pi} E\cos\gamma_0 - \frac{3}{\pi}XI_d \quad \text{(inverter station)}$$

where, E is a measured A.C. voltage, (c) means for selecting the converter station which can be operated with the smallest maximum D.C. voltage calculated in the above steps, (d) means for calculating a D.C. voltage V for each converter station not selected in step (c) above, each D.C. voltage being calculated by correcting said smallest maximum D.C. voltage with the voltage drop on the HVDC transmission line between said selected station and the station for which a D.C. voltage is being calculated, and (e) said delay angle value calculating means for calculating a delay angle value $\alpha$ for each converter in accordance with the following equation $$\alpha = \cos^{-1}\left\{\frac{1}{\frac{3}{\pi}\sqrt{2}\ E}\left(V + \frac{3}{\pi}XI_d\right)\right\}$$

where, E is a measured A.C. voltage, V is a selected smallest D.C. voltage or calculated D.C. voltage in above steps.

28. A system of controlling an HVDC-power transmission plant according to claim 27, wherein each converter station further includes a D.C. current measuring means for said HVDC transmission line; means for calculating the current deviation $\Delta I_d$ for each converter station, and said delay angle value calculating means including means for calculating a delay angle $\alpha'$ for each converter in accordance with the following equation, $$\alpha' = \cos^{-1}\left\{\cos\alpha - \frac{1}{\sqrt{2}\ E}X\cdot\Delta I_d\right\}.$$

29. A system of controlling an HVDC-power transmission plant according to claim 28, wherein each converter station further includes a D.C. voltage measuring means for said HVDC transmission line, means for calculating a voltage deviation $\Delta V$ for each converter station, said delay angle value calculating means including means for calculating a delay angle value $\alpha'''$ for each converter in accordance with the following equation, $$\alpha'' = \cos^{-1}\left\{\cos\alpha - \frac{1}{\frac{3}{\pi}\sqrt{2}\ E}\Delta V\right\}.$$

30. A system of controlling an HVDC-power transmission plant according to claim 28, wherein said delay angle value calculating means includes means for calculating a delay angle value $\alpha''$ for only one converter, which evidences a voltage change that is contrary to the changes evidenced by the all other stations, with the following equation, $$\alpha'' = \cos^{-1}\left\{\cos\alpha - \frac{1}{\sqrt{2}\ E}(X\Delta I_d + X'\Delta I_d')\right\}$$

where $X'$ is the commutation reactance and $\Delta I_d'$ is the D.C. current deviation of another converter station.

31. A system of controlling an HVDC power transmission plant, which comprises a D.C. transmission line, said transmission line comprising two D.C. conductors; at least two converter stations, at least one of said stations being a rectifier and at least one an inverter station, each station being connected on its A.C. side to an A.C. system and on its D.C. side in parallel with the other stations through a D.C. reactor, and being provided with an A.C. voltage measuring means for said A.C. system, a D.C. voltage measuring means for said D.C. transmission line, a D.C. current measuring means for said D.C. transmission line, an encoder for coding the opening or closing of circuit breakers in an said A.C. system, a first data sending means for sending the outputs of said measuring means and said encoder to a central control means, a first data receiving means for receiving the outputs of the central control means and an automatic pulse phase shifter for sending a firing pulse to the converter in the station in accordance with the outputs of said first data receiving means; the central control means being provided with a second data receiving means for receiving the outputs of said first data sending means, a setting means for setting certain data, a calculating means for calculating a delay angle value for each converter in accordance with the outputs of said second data receiving means and said setting means and a second data sending means for sending the outputs of said calculating means to said first receiving means; which system further comprises;

(a) means for setting an operational D.C. current $I_d$ and a commutation reactance X for each converter station, a resistance R for each portion of the HVDC transmission line, some constants of said A.C. system, a minimum delay angle value $\alpha_0$ for the converter in each rectifier station and a margin angle value $\gamma_0$ for the converters in each inverter station, (b) means for calculating each A.C. voltage E of each said A.C. system in accordance with said some constants of each said A.C. system in the case where each said operational D.C. current is changed, (c) means for calculating a maximum D.C. voltage Vdmax for each converter station in accordance with the following equations, $$VdMax = \frac{3\sqrt{2}}{\pi} E \cos \alpha_0 - \frac{3}{\pi} X I_d \quad \text{(rectifier station)}$$

$$VdMax = \frac{3\sqrt{2}}{\pi} E \cos \tau_0 - \frac{3}{\pi} X I_d \quad \text{(inverter station)}$$

(d) means for selecting the converter station which can be operated with the smallest maximum D.C. voltage calculated in the above steps, (e) means for calculating a D.C. voltage V for each converter station not selected in step (d) above, each D.C. voltage being calculated by correcting said smallest D.C. voltage with the voltage drop on the HVDC transmission line between said selected station and the station for which a D.C. voltage is being calculated, and (f) said delay angle value calculating means calculating a delay angle value $\alpha$ for each converter in accordance with the following equation, $$\alpha = \cos^{-1}\left\{ \frac{1}{\frac{3}{\pi}\sqrt{2} E} \left(V + \frac{3}{\pi} X I_d\right) \right\}$$

where, V is the selected smallest maximum D.C. voltage or the D.C. voltage calculated in the above steps.

32. A system of controlling an HVDC-power transmission plant according to claim 31, wherein each converter station further includes a D.C. current measuring means for said HVDC transmission line; means for calculating the current deviation $\Delta I_d$ for each converter station, and said delay angle value calculating means including means for calculating a delay angle value $\alpha'$ for each converter in accordance with the following equation, $$\alpha' = \cos^{-1}\left\{ \cos \alpha - \frac{1}{\sqrt{2} E} X \cdot \Delta I_d \right\}.$$

33. A system of controlling an HVDC-power transmission plant according to claim 32, wherein each converter station further includes a D.C. voltage measuring means for said HVDC transmission line, means for calculating a voltage deviation $\Delta V$ for each converter station, said delay angle value calculating means including means for calculating a delay angle value $\alpha''$ for each converter in accordance with the following equation, $$\alpha'' = \cos^{-1}\left\{ \cos \alpha - \frac{1}{\frac{3}{\pi}\sqrt{2} E} \Delta V \right\}.$$

34. A system of controlling an HVDC-power transmission plant according to claim 32, wherein said delay angle value calculating means includes means for calculating a delay angle value $\alpha''$ for only one converter, which evidences a voltage change that is contrary to the changes evidenced by the all other stations, with the following equation, $$\alpha'' = \cos^{-1}\left\{ \cos \alpha - \frac{1}{\sqrt{2} E} (X \Delta I_d + X' \Delta I_d') \right\}$$

where X' is the commutation reactance and $\Delta I_d'$ is the D.C. current deviation of another converter station.

* * * * *